US010762176B2

(12) United States Patent
Casey et al.

(10) Patent No.: US 10,762,176 B2
(45) **Date of Patent: *Sep. 1, 2020**

(54) SOFTWARE MANAGEMENT IN DYNAMICALLY SCALABLE CLOUD ENVIRONMENT

(71) Applicant: CenturyLink Intellectual Property LLC, Broomfield, CO (US)

(72) Inventors: Steven M. Casey, Littleton, CO (US); Thomas Schwengler, Lakewood, CO (US); Kevin M. McBride, Lone Tree, CO (US); Felipe Castro, Erie, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 136 days.

This patent is subject to a terminal disclaimer.

(21) Appl. No.: 16/149,446

(22) Filed: Oct. 2, 2018

(65) Prior Publication Data

US 2019/0034600 A1 Jan. 31, 2019

Related U.S. Application Data

(63) Continuation of application No. 14/884,539, filed on Oct. 15, 2015, now Pat. No. 10,095,845.

(Continued)

(51) Int. Cl.

*G06F 7/04* (2006.01)
*H04N 7/16* (2011.01)

(Continued)

(52) U.S. Cl.

CPC ........ *G06F 21/105* (2013.01); *G06F 9/45558* (2013.01); *G06Q 30/018* (2013.01);

(Continued)

(58) Field of Classification Search

CPC ............... G06F 21/105; G06F 9/45558; G06F 2009/45562; G06F 2009/4557;

(Continued)

(56) References Cited

U.S. PATENT DOCUMENTS 10,095,845 B2 10/2018 Casey et al.
2006/0059096 A1 * 3/2006 Dublish .................. H04L 63/10 705/57

(Continued)

FOREIGN PATENT DOCUMENTS

WO WO-2016-089484 6/2016

OTHER PUBLICATIONS

International Search Report and Written Opinion prepared by the Korean Intellectual Property Office as International Searching Authority for PCT Intl Patent App. No. PCT/US2015/056084 dated Feb. 2, 2016; 11 pages.

(Continued)

*Primary Examiner* — John B King
*Assistant Examiner* — Darshan I Dhruv

(57) ABSTRACT

A license manager includes a processor and non-transitory computer readable media having encoded thereon a set of instructions executable by the at least one processor to receive a request, from a virtual machine, to reserve an individual license of the set of authorized licenses for a vendor software instance, determine the availability licenses for the requested vendor software, register a unique identifier of the virtual machine in association with an available individual license, grant the individual license to the virtual machine, and prevent the granted individual license from concurrent use by other virtual machines or devices.

19 Claims, 7 Drawing Sheets

Start
305 Provision at least one virtual machine instance
310 Provide access to at least one vendor software
315 Generate a request to reserve a license for vendor software
320 Receive the request to reserve the license
325 Determine, an availability of the license
330 Register a unique identifier in association with the license
335 Grant the license
340 Prevent the license from concurrent use by other devices
End
300A

Related U.S. Application Data

(60) Provisional application No. 62/092,365, filed on Dec. 16, 2014, provisional application No. 62/087,659, filed on Dec. 4, 2014.

(51) Int. Cl.

| | |
|---|---|
| ***G06F 21/10*** | (2013.01) |
| ***H04L 29/06*** | (2006.01) |
| ***H04L 29/08*** | (2006.01) |
| ***G06F 9/455*** | (2018.01) |
| ***G06Q 30/00*** | (2012.01) |
| ***H04L 12/24*** | (2006.01) |

(52) U.S. Cl.

CPC .......... *H04L 41/5003* (2013.01); *H04L 67/02* (2013.01); *H04L 67/10* (2013.01); *H04L 67/322* (2013.01); *H04L 67/42* (2013.01); *G06F 2009/4557* (2013.01); *G06F 2009/45562* (2013.01); *G06F 2009/45595* (2013.01); *G06F 2221/0773* (2013.01)

(58) Field of Classification Search

CPC .. G06F 2009/45595; G06F 2221/0773; G06Q 30/018; H04L 41/5003; H04L 67/02; H04L 67/10; H04L 67/322; H04L 67/42

See application file for complete search history.

(56) References Cited

U.S. PATENT DOCUMENTS

2008/0022003 A1* 1/2008 Alve .................... G01S 5/0009 709/229
2009/0156129 A1* 6/2009 Hassan ................ G06F 9/5055 455/66.1
2009/0328225 A1 12/2009 Chambers et al.
2010/0205303 A1* 8/2010 Chaturvedi ............ G06F 21/10 709/226
2011/0072522 A1* 3/2011 Koka .................... G06Q 10/00 726/31
2011/0131315 A1* 6/2011 Ferris ................... G06F 21/105 709/224
2011/0251937 A1 10/2011 Falk et al.
2012/0311574 A1* 12/2012 Song .................. G06F 11/3058 718/1
2013/0054780 A1* 2/2013 Bade ...................... H04L 43/08 709/224
2013/0262250 A1* 10/2013 Lingafelt .............. G06Q 30/06 705/26.1
2013/0262265 A1* 10/2013 Song .................... G06F 21/105 705/26.41
2014/0013440 A1* 1/2014 Thakur ................ G06F 21/105 726/27
2014/0137261 A1* 5/2014 Chen .................... G06F 21/105 726/26
2016/0162666 A1 6/2016 Casey et al.

OTHER PUBLICATIONS

Partial Supplementary European Search Report, dated Jul. 24, 2018, 12 pages.

Extended European Search Report, PCT/US2015/056084 dated Oct. 26, 2018, 11 pages.

* cited by examiner

300B

300C

400

SOFTWARE MANAGEMENT IN DYNAMICALLY SCALABLE CLOUD ENVIRONMENT

CROSS-REFERENCES TO RELATED APPLICATIONS

This application is a continuation of U.S. patent application Ser. No. 14/884,539, filed on Oct. 15, 2015 by Steven M. Casey et al., entitled, "Software Management in Dynamically Scalable Cloud Environment," which claims priority to U.S. Provisional Patent Application Ser. No. 62/087,659, filed on Dec. 4, 2014 by Steven M. Casey et al., entitled, "Cloud Services—Software Management," and U.S. Provisional Patent Application Ser. No. 62/092,365, filed on Dec. 16, 2014 by Steven M. Casey et al., entitled, "Cloud Services—Software Management," the disclosures of which are incorporated herein by reference in its entirety and for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to a software management system, and more particularly to software management in scalable environments, such as cloud environments.

BACKGROUND

Increasingly, systems, applications, and infrastructures are offered as cloud-based services. Each of these cloud-based services variously run, or allow users to access, different types of software. Typically, a cloud service provider will operate one or more server farms and/or data centers as a hub from which the cloud-services are provided. Often, the server farms and/or data centers are located in different geographic regions allowing customers to be in closer proximity to the server farms or data centers utilized by those customers.

Often, both customers utilizing a service provider's cloud-based services, and the cloud service providers themselves, will access and run software in utilizing and providing the cloud-based services, respectively. For example, customers may utilize a cloud service provider's servers that host the customer's virtual machines (VM). Each of the customer's VMs may in turn access or execute software, as needed by the customer. If the software requires a license to run, each software instance running on a VM will require a license (or accounted for within the group license).

Cloud-based computing environments can dynamically change as the number of supported VMs, individual customers, and the number of software instances in use may scale up or down, at any given time. Thus, current, conventional software license management schemes rely on a system that either manually, or periodically, audits the cloud computing environment for the number of software instances in use.

Furthermore, the number of running software instances also dynamically changes, corresponding to the changes in the cloud environment. Traditional systems are not equipped to track the demand for a particular software, nor the availability of licenses for the particular software in real-time. Thus, in conventional situations, a static number of licenses may be allotted for use at a specific server farm, or for a specific customer, such as, by allotting only enough licenses corresponding to an average concurrent usage at the server farm, or by particular customers on a per customer basis.

Due to the reliance on the auditing process, software may be over-provisioned, exceeding the allotted number of software licenses. At other times, software may be under-provisioned, where software licenses that are not in use are not recognized as being available until the audit is conducted. In certain situations, a customer may be allocated a license to run a particular software instance on their VM, but the license may not be in use at given time, or over a specific duration of time. Conventional systems are unable to identify real-time availability of an individual license, without performing an audit of the cloud-computing environment itself, including the servers of the server farm or the VMs themselves.

Thus, a robust system for managing software in dynamic, scalable computing environments is provided in the embodiments below.

BRIEF SUMMARY

According to a set of embodiments, a system, apparatus, and method for managing software in a dynamically scalable environment are provided.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In one aspect, a system for managing software in dynamically scalable network environments includes a plurality of servers hosting one or more virtual machine instances. Each of the plurality of servers may be in communication with a service network and accessible to at least one client with at least one virtual machine instance of the one or more virtual machine instances associated with the at least one client. Each of the one or more virtual machine instances may have a unique identifier. A network orchestrator is provided in communication with the plurality of servers, wherein the network orchestrator handles requests from the at least one client to provision the at least one virtual machine instance associated with the at least one client in one or more of the plurality of servers. A license manager in communication with each of the one or more virtual machine instances is provided. The license manager includes at least one processor, a network communications interface in communication with the plurality of servers and the network orchestrator, a license database having one or more sets of authorized licenses, each set of authorized licenses respectively associated with a respective vendor software, and non-transitory computer readable media having encoded thereon a set of instructions. The set of instructions may be executable by the at least one processor to receive, via the network communications interface, a request to reserve an individual license of the set of authorized licenses for a vendor software instance on one of the at least one virtual machine instance, the vendor software instance requiring the individual license to run on the one of the at least one virtual machine instance. The license manager may further determine, via the license database, an availability of an individual license associated with the vendor software instance in the request. The license manager may then register, in the license database and in response to determining that the individual license is available, the unique identifier of the one of the at least one virtual machine in association with the individual license. Once registered, the license manager may grant the individual license to the one of the at least one virtual machine, and prevent the individual license from concurrent use by other virtual machine instances.

In one set of embodiments, the license manager may further include a set of instructions executable to determine a service level agreement of each of the at least one client, establish, based on the service level agreement, a priority level of license availability to the at least one client respectively, and ensure the availability of an individual license to the at least one client based on the priority level. In some embodiments, an individual license in a set of authorized licenses may be reserved for the at least one client based on the priority level.

In another set of embodiments, the license manager may further include a set of instructions executable to create at least one restriction condition on the use of the individual license determining the availability of the individual license, and revoke the individual license upon an occurrence of the at least one restriction condition. In various embodiments, the license manager may determine a location, of a server of the plurality of servers hosting the at least one virtual machine instance, from the unique identifier of the at least one virtual machine instance, wherein the at least one restriction condition restricts the availability of the individual license based on the location of the server. In some embodiments, the plurality of servers or virtual machine instance may include a software defined radio in communication with the license manager, the software defined radio identifying a physical location of a server of the plurality of servers hosting the at least one virtual machine instance, wherein the at least one restriction condition restricts the availability of the individual license based on the physical location of the server of the plurality of servers.

In another set of embodiments, the license manager may further include instructions executable to receive, a request to renew the individual license granted to the one of the at least one virtual machine, and determine, via the license database, whether the individual license is available to be renewed based on whether the individual license has been reserved or requested by another virtual machine. In a further set of embodiments, the license manager may further include instructions executable to generate an alert when the number of available individual licenses in a set of authorized licenses reaches a limit, and transmit the alert to a service provider providing the set of authorized licenses indicating that the limit has been reached, or to one of the at least one client having the individual license indicating the individual license may be revoked. In some embodiments, the license manager may further include instructions executable to track, via communication with the network orchestrator, the individual license from a first virtual machine instance of the at least one virtual machine instance utilizing the vendor software to a second virtual machine instance of the at least one virtual machine instance utilizing the vendor software, wherein the network orchestrator migrates the first virtual machine instance from a first server of the plurality of servers to a second server of the plurality of servers as the second virtual machine instance. The license manage may then determine whether the second virtual machine instance requires another individual license for the vendor software, and determine, in response to determining that another individual license is required, an availability of a second individual license for use by the second virtual machine.

In another aspect, a license manager is provided including at least one processor, a network communications interface in communication with a plurality of servers hosting one or more virtual machine instances and a network orchestrator in communication with the plurality of servers, wherein the network orchestrator handles requests from the at least one client to provision the at least one virtual machine instance associated with the at least one client in one or more of the plurality of servers, a license database having one or more sets of authorized licenses, each set of authorized licenses corresponding to a respective vendor software, and non-transitory computer readable media having encoded thereon a set of instructions. The instructions may be executable by the at least one processor to receive, via the network communications interface, from one of the at least one virtual machine instance, a request to reserve an individual license of the set of authorized licenses for a vendor software instance on the one of the at least one virtual machine instance, the vendor software instance requiring the individual license to run on the one of the at least one virtual machine instance. In response to receiving the request, the license manager may determine, via the license database, an availability of an individual license associated with the vendor software instance in the request, register, in the license database and in response to determining that the individual license is available, a unique identifier of the one of the at least one virtual machine in association with the individual license, grant the individual license to the one of the at least one virtual machine, and prevent, via the license database, the individual license from concurrent use by other virtual machine instances.

In one set of embodiments, the license manager may further include instructions executable to determine a service level agreement of each of the at least one client, establish, based on the service level agreement, a priority level of license availability to the at least one client respectively, and ensure the availability of an individual license to the at least one client based on the priority level. In some embodiments, an individual license in a set of authorized licenses may be reserved for the at least one client based on the priority level. In another embodiment, an individual license may be revoked from a first client having a first priority level and granted to a second client having a second priority level higher than the first priority level.

In yet another set of embodiments, the license manager may further include a set of instructions executable to create at least one restriction condition on the use of the individual license determining the availability of the individual license, and revoke the individual license upon an occurrence of the at least one restriction condition. In some embodiments, a location of a server of the plurality of servers hosting the at least one virtual machine instance is determined based on the unique identifier of the at least one virtual machine instance, wherein the at least one restriction condition restricts the availability of the individual license based on the location of the server. In further embodiments, the plurality of servers includes a software defined radio in communication with the license manager, the software defined radio identifying a physical location of a server of the plurality of servers hosting the at least one virtual machine instance, wherein the at least one restriction condition restricts the availability of the individual license based on the physical location of the server of the plurality of servers.

In a further set of embodiments, the license manager may further include instructions executable to generate an alert when the number of available individual licenses in a set of authorized licenses reaches a limit, and transmit the alert to a service provider providing the set of authorized licenses indicating that the limit has been reached, or to one of the at least one client having the individual license indicating the individual license may be revoked.

In a further aspect, a method for managing licenses is provided. The method includes provisioning, via a network orchestrator, at least one virtual machine instance on a plurality of servers, each of the at least one virtual machine instance associated with an at least one client, providing, via the plurality of servers, access to at least one vendor software to each of the at least one virtual machine instances, generating, at at least one of the plurality of servers, a request to reserve an individual license in a set of authorized licenses for a particular vendor software, the individual license reserved in association with a virtual machine instance of the at least one virtual machine instance, the virtual machine instance associated respectively with a client of the at least one client, receiving, via a license manager, the request to reserve the individual license in the set of authorized licenses for the particular vendor software, the particular vendor software requiring the individual license to run on the virtual machine instance, determining, via the license manager, an availability of the individual license from the set of authorized licenses, registering, via the license manager, a unique identifier of the virtual machine instance in association with the individual license, granting, via the license manager, the individual license to the virtual machine instance, and preventing, via the license manager, the individual license from concurrent use by other virtual machine instances.

In a set of embodiments, the method may further include determining, via the license manager, a service level agreement of the virtual machine instance, establishing, via the license manager, based on the service level agreement, a priority level of license availability to the virtual machine instance, and ensuring, via the license manager, the availability of an individual license to the virtual machine instance based on the priority level. A further set of embodiments includes creating, at the license manager, at least one restriction condition on the use of the individual license determining the availability of the individual license, and revoking, via the license manager, the individual license upon an occurrence of the at least one restriction condition.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
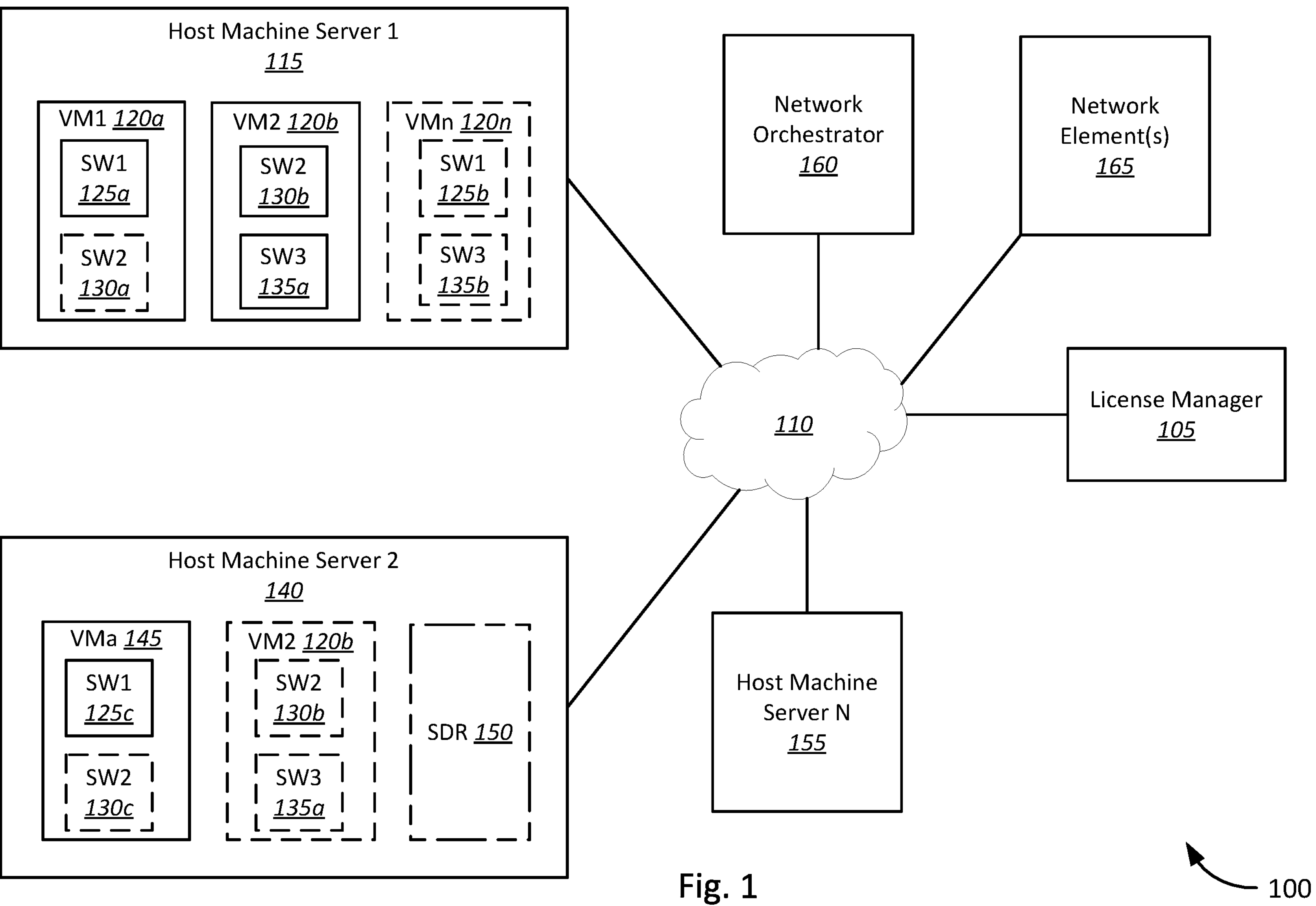
FIG. 1 is a system block diagram of a software management system, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The various embodiments address the problems presented by current conventional software license managing systems by localizing license management operations to a dedicated license manager that oversees, without limitation, the granting and revocation of software licenses, registration of hardware systems, registration of software, tracking of license availability in real-time, renewals of software licenses, managing customer software license priorities, monitoring restrictions placed on licenses, and generating alerts. Thus, the license manager obviates the need for separate architecture and subsystems to conduct an audit of server-side resources, such as the host machines themselves, and the VMs running on the server host machines, to manage software licenses. Instead, the license manager conducts all software license management interactions between the various server hosts and VM instances. As a result, the license manager allows for more agile, responsive control over software licenses that can respond to a dynamically changing cloud-based environment.

In a set of exemplary embodiments, the license manager may further communicate with a network orchestrator. In various embodiments, the network orchestrator is responsible for handling and coordinating provisioning requests for a customer for host machine server resources. Under the traditional audit-based license management regime, the network orchestrator might provision one or more VM instances with access to resources including software, without regard to the availability of licenses for that software. Thus, by enabling communication between the network orchestrator and the license manager, the license manager may indicate to a customer whether a particular software may be provisioned and/or accessible, or the license manager may reserve a license for the particular software for a VM instance to be provisioned by the network orchestrator.

Similarly, when a VM instance is relocated from one server host machine to different host machine, the license manager may be able to track the software license from the first server host machine to the new host machine on which the VM instance continues to utilize the software license. Again, under the previous audit-based license management regime, these changes to the system and corresponding changes to software license usage would not be recognized until an audit is conducted of the various server host machines and corresponding VM instances.

The accompanying descriptions of FIGS. 1-4 are provided for purposes of illustration and should not be considered to limit the scope of the different embodiments. FIGS. 1-4 may refer to examples of different embodiments corresponding to various stages in a process, and components of the software management system, which can be considered alternatives or which can be used in conjunction with one another in the various embodiments.

FIG. 1 is a system block diagram of a system for software management 100, in accordance with various embodiments. According to one set of embodiments, the system 100 includes a license manager 105, network 110, host machine server 1 115, host machine server 2 140, host machine server N 155, network orchestrator 160, and other network element(s) 165. Host machine server 1 through host machine server N ("host machine servers" collectively), refers to the a series of host machine servers coupled to network 110, where host machine server N represents a final host machine server in the series of host machine servers, numbered sequentially "1" through "N."

Host machine server 1 115 hosts a plurality of VM instances, VM instance 1 120*a*, VM instance 2 120*b*, and optionally includes VM instance n 120*n*, depicted in phantom lines. VM instance 1 through VM instance n ("VMs 120" collectively), refers to a series of VM instances hosted by the host machine server 1 115, where VM instance "n" represents a final VM instance in the series of VM instances, numbered sequentially "1" through "n."

VM instance 1 120*a* includes an instance of software 1 (SW1) 125*a*, and optionally an instance of software 2 (SW2) 130*a*. VM instance 2 120*b* includes a second instance of SW2 130*b*, and an instance of software 3 (SW3). VM instance n optionally includes a second instance of SW1 125*b* and a second instance of SW3 135*b*. Host machine server 2 140 includes VM instance "a" 145, found only on host machine server 2, and optionally includes VM instance 2 120*b* and software defined radio (SDR) 150, both depicted in phantom lines. VM instance "a" 145 includes a third instance of SW1 125*c*, and optionally includes a third instance of SW2 130*c*. Optional VM instance 2 120*b* in host machine server 2 140 includes the second instance of SW2 130*b* and the first instance of SW3 135*a*.

In various embodiments, the license manager 105 may comprise, without limitation, a server computer, web portal, or application running on the server computer. The server computer may comprise, without limitation, one or more hardware elements that may be electrically coupled together through various means, including, without limitation, a computing bus, or through other means as appropriate.

The hardware elements may include, without limitation, or one or more processors, such as a central processing unit (CPU), graphics processing unit (GPU), digital signal processing (DSP) chips, field programmable gate array (FPGA), application specific integrated circuit (ASIC), a system on a chip (SoC), or other type of embedded processor. Hardware elements may further include one or more storage devices, working memory, non-transitory computer readable media, and communications subsystems. The non-transitory computer readable media may encoded with various computer instructions, which may be read into working memory, and executed by the one or more processors to perform software management related processes. The communications subsystem of the license manager 105 may further allow the license manager 105 to communicate with other network devices over network 110. The license manager may include, by way of example, and without limitation, a data server, web server, software license database, or cloud computing device. A data server may include (or be in communication with) a web server, which can be used, merely by way of example, to process requests for a web interface or web application. In some embodiments, the software license database of the license manager may be locally integrated into the server computer, or may be an externally accessibly database.

The network 110 may include, without limitation, any type of network familiar to those skilled in the art that can support data communication. For example, various embodiments may employ, without limitation, a local area network (LAN), which includes, without limitation, a fiber network, an Ethernet network, a Token-Ring™ network and/or the like; a wide-area network; a wireless wide area network (WWAN); a virtual network, such as a virtual private network (VPN); the Internet; an intranet; an extranet; a public switched telephone network (PSTN); an infra-red network; a wireless network, including without limitation a network operating under any of the IEEE 802.11 suite of protocols, including the Bluetooth™ protocol known in the art, or any other wireless protocol; a cellular voice or data network; or any combination of these and other networks.

Through network 110, the license manager 105 may communicate with the host machines, host machine server 1 115 through host machine server N 155. In various embodiments, each of the host machine server 1 115, host machine server 2 140, and other host machine servers, up to and including host machine server N 155, may include, without limitation, a respective one or more processors, as described above with respect to the license manager 105. Hardware elements may further include one or more storage devices, working memory, non-transitory computer readable media, and communications subsystems. The non-transitory computer readable media may encoded with various computer instructions, which may be read into working memory, and executed by the one or more processors. The communications subsystem each of the host machine servers 115, 140, 155 may further allow communications over network 110.

Host machine server 2 140 further includes an optional SDR 150. In various embodiments, the SDR 150 may comprise part of the host machine server 2 140 itself. The SDR 150 may be coupled to an antenna of the host machine server 2 or an external of a separate transceiver system. Depending on the protocol and type of wireless communication utilized in a particular environment, the SDR may utilize, without limitation, a wide-band antenna, narrow-band antenna, tunable antenna, an antenna array, or other suitable antenna elements. For example, in one set of embodiments, the SDR may be used to communicate with a global positioning system (GPS) satellite, and a corresponding GPS antenna/receiver may be utilized to determine a position of host machine server 2 140.

In various embodiments, VM1 through VMn 120, and VMa 145 may include, without limitation, their own respective sets of virtualized hardware elements. Each of the VMs 120, 145 may be hosted on, and utilize resources of, their respective host machine servers 115, 140, 155. For example, in some embodiments, each of VMs 1-*n* 120 may respectively include, without limitation, a virtualized one or more processors, one or more storage devices, working memory, non-transitory computer readable media, and communications subsystems. Each of VM1 through VMn, and VMa may each independently access or utilize various hardware and software resources through their respective host machine servers 115, 140, 155. For example, SW1 125*a*, 125*b* (125 collectively), SW2 130*a*, 130*b* (130 collectively), and SW3 135*a*, 135*b* (135 collectively) may each be made available to the VMs 120, 145.

Various embodiments may further call for a network orchestrator 160. In some embodiments, the network orchestrator 160 may include, without limitation, one or more processors, one or more storage devices, working memory, non-transitory computer readable media, and communications subsystems. The network orchestrator 160 may be reachable over network 110 to receive requests from customers to provision host machine server 115, 140, 155 resources. In some embodiments, the network orchestrator 160 may provide a web portal or application, available to customers over network 110. The web portal or application may act to receive customer input specifying parameters with which to provision host machine server 115, 140, 155 resources for the customer. In other embodiments, the web portal or application may be hosted on a separate web server with which the network orchestrator 160 communicates with over network 110. The network orchestrator may further provision, based on the customer-provided parameters, VMs 120, 145 on their respective host machine servers 115, 140, 155. The network orchestrator may also coordinate and organize the migration of a VM instance from one host machine server 115, 140, 155 to another host machine server 115, 140, 155. In some further embodiments, the network orchestrator may also manage the provisioning of software resources to the various VMs 120, 145.

In various embodiments, the license manager 105 may further be in communication with one or more different types of network element(s) 165. Network element(s) 165 may include any network devices on the path from a service provider's central office to a customer's premises. For example, in various embodiments, the network element(s) 165 may include, without limitation, databases, routers, switches, firewalls, broadband remote access servers (BRAS), cable modem termination systems (CMTS), digital subscriber line access multiplexers (DSLAM), optical line termination (OLT), network interface devices (NID), optical network terminal (ONT), residential gateways, modems, set top boxes, and other like devices. In some embodiments, the network element(s) 165 may themselves be virtualized hardware.

In one set of embodiments, each of host machine server 1 115, host machine server 2 140, through host machine server N 155 are a cluster of servers belonging to the same server farm or data center. In other embodiments, the host machine servers 115, 140, 155 belong to separate server farms or data centers. In some embodiments, the host machine servers 115, 140, 155 may be associated with a unique identifier. In other embodiments, each of the VM instances 120, 145 may also, or alternatively, be associated with a respective unique identifier. The unique identifier may serve to identify the particular host machine server 115, 140, 155 or VM instance 120, 145. The unique identifier may include, without limitation, an internet protocol (IP) address, media access control (MAC) address, location information, serial number, model number, customer information or identification, international mobile station equipment identity (IMEI), mobile equipment identifier (MEI), or other identifier suitable to uniquely identify the host machine server 115, 140, 155, or VM instances. In some further embodiments, network element(s) 165 may each also be associated with a unique identifier using the same or similar techniques.

According to a set of embodiments employing the hardware and architectures described above, the network orchestrator 160 may receive a request for cloud-resources associated with a particular customer. The request may include a request for a system, application, or other resources available from the cloud service provider. Based on the request, the network orchestrator may provision one or more VM instances on a host machine server 115, 140, 155. In one set of embodiments, the network orchestrator may provision host machine server 1 115 with VM1 120*a*. In this set of embodiments, the request may have indicated a request to include or allow access to software SW1 125*a* and SW2 130*a*. Similarly, network orchestrator 160 may receive a request from a second customer for access to network resources. Based on this request, the network orchestrator 160 may provision VM2 120*b* with software in the form of a second instance of SW2 130*b* and a first instance of SW3 135*a*. The network orchestrator may provision VM instances on host machine server 1 115 in a similar manner for each customer, the final customer being customer "n." VMn 120*n* is provisioned for customer "n," to include a second instance of SW1 125*b* and a second instance of SW3 135*b*.

The network orchestrator 160 may provision VMs in this manner for multiple host machine servers 115, 140, 155. For example, network orchestrator 160 may receive a request from customer "a," who is then provisioned with VMa 145 on host machine server 2 140, with a third instance of SW1 125*c*, and a third instance of SW2 130*c*. Thus, in this manner, multiple VMs 120, 145 may be provisioned on multiple different host machine servers 115, 140, with each of the VMs 120, 145 running multiple instances of different software. In some embodiments, network orchestrator 160 may determine which host machine server 115, 140, 155 to utilize based on the proximity of the customer sending the request to a particular host machine server. In other embodiments, other criteria may be used, such as proximity to a customer's target population, such as the customer's own customer base. In further embodiments, a preference for a host machine server location may be included, for example, in the request itself. In yet further embodiments, host machine servers 115, 140, 155, may be utilized in a predetermined order. For example, in some embodiments, host machine server 2 140 may only be utilized when host machine server 1 115 reaches a threshold capacity. In other embodiments, the host machine server 115, 140, 155 may be chosen based on the computational load on each host machine server 115, 140, 155. For example, the network orchestrator 160 may determine the load at each server in real-time, or calculate an average load experienced at a particular server. In this manner, the network orchestrator 160 may balance the computational load between the host machine servers 115, 140, 155.

The network orchestrator 160 may further provision each of the VMs 120, 145 with the software SW1 125, SW2 130, and SW3 135, as indicated above. In some embodiments, the software 125, 130, 135 may be provisioned only after confirming the availability of a license with license manager 105. In other embodiments, the VMs 120, 145 may be provisioned with instances of the software 125, 130, 135, but the VMs 120, 145 may only be able to access or run the software 125, 130, 135 after retrieving a license from license manager 105. In yet other embodiments, the network orchestrator 160 may not provision software 125, 130, 135, but rather the VMs 120, 145 may themselves retrieve or gain access to software 125, 130, 135 only after receiving an available license from license manager 105.

The license manager 105 may operate to track a total number of licenses, the number of available licenses, and the licenses granted to VMs 120, 145, and other network element(s) 165. For example, in some embodiments, as described above, the license manager 105 may maintain a database or list of available licenses for each software SW1 125, SW2 130, and SW3 135. It is to be understood that the license manager is described with respect to three software programs by way of example only. It will be appreciated by those of ordinary skill in the art that in other embodiments, licenses for a greater or lesser number of software programs may be managed by the license manager. Thus, in one set of embodiments, a request to reserve a license for a software instance may be generated by the host machine server 115, 140, 155, or individual VM 120, 145 requesting the software instance. The license manager 105 may then receive a request to reserve a license for the software instance. Thus, in some embodiments, the license manager 105 may receive a request to reserve a license for a first instance of SW1 125*a*. The license manager 105 may then determine, based on the list of available licenses, whether a license for SW1 125 is available. If the license manager 105 determines that a license is available, the license manager 105 may then register a unique identifier of the VM instance 120, 145 to be granted the available license. Thus, the available license will be tied to the particular VM instance 120, 145 utilizing the license. The license manager 105 may then grant the available license to the VM instance 120, 145. In this example, the license manager may grant an available license to VM1 120*a* for the instance of SW1 125*a* running on VM1 120*a*. A unique identifier for VM1 120*a* may also be registered, at the license manager 105, in association with the license given for the software instance of SW1 125*a*. In this manner, the license registered to VM1 120*a* is no longer available for use by another VM 120, 145, or other network element(s) 165 while it is being used by VM1 120*a*.

In a similar manner, VM2 120*b* may also request a license for its own instance of SW2 130*b*. The license manager 105 may check a license database to determine the availability of a second license for the instance of SW2 130*b* requested by VM2 120*b*. If the license manager 105 determines that a license is available, the license manager 105 may then register a unique identifier of VM2 120*b* in association with the available license for the instance of SW2 130*b*. In various embodiments, the same procedure may be repeated for the instance of SW3 135*a* running on VM2 120*b*. Similarly, the license manager may receive a request from VMn 120*n* for licenses for an instance of SW1 125*b* and another instance of SW3 135*b*. VMa 145 may also request licenses for its own instance of SW1 125*c* and SW2 130*c*.

In various embodiments, a certain number of licenses may be provided to the cloud service provider as agreed to between the cloud service provider and a software vendor of the respective software SW1 125, SW2 130, and SW3 135. In other embodiments, a certain number of licenses may be provided to the customer directly, and the customer may provide the license information to the license manager 105 to manage its licenses of the across each of the customer's VM instances 120, 145. For example, in some embodiments, VM1 120*a* and VM2 120*b* may belong to the same customer.

In some sets of embodiments, the total number of licenses for SW1 125 may be limited. For example, in one set of embodiments, the number of licenses for SW1 125 may be limited to two licenses. Thus, when VMa 145 requests a license to run an instance of SW2 130*c*, the license manager 105 may not grant a license to VMa 145 until a license in use becomes available. When VM1 120*a* has finished using SW2 130*a*, VM1 120*a* may send an indication to license manager 105 that it is no longer running SW2 130*a*. The license may then be disassociated from the identifier of VM1 120*a* by the license manager 105, or actively revoked by the license manager 105 and labeled as available. In other embodiments, VM1 120*a* may not send an indication to license manager 105, and instead license manager 105 may monitor VM1's 120*a* usage of SW2 130*a*. If license manager 105 detects that SW2 130*a* has been idle for a threshold duration of time, license manager 105 may recall the license issued to VM1 120*a* to run SW2 130*a*. In further embodiments, various conditions may be placed on the recalled license for SW2 130*a*, such as giving priority to VM1 120*a* to once again use the license when it needs to run SW2 130*a*. A similar process may be used to determine if the license for SW2 130*b* running on VM2 120*b* has become available. Thus, if a license previously associated with either of the two instances of SW2 130*a*, 130*b* becomes available, VMa 145 may then be granted one of the licenses previously associated with either of the two instances of SW2 130*a*, 130*b*.

In some further embodiments, the license manager 105 may further determine a demand for licenses for particular vendor software. For example, in one set of embodiments, license manager 105 may determine, based on the number of requests for licenses, a projected average concurrent use for each of SW1 125, SW2 130, and SW3 135 by VM instances

120, 145, that more licenses may be needed for any or all of SW1 125, SW2 130, and SW3 135. For example, in some embodiments, as in the example above, SW1 125 may be limited to two licenses. The license manager 105 may then determine that, based on the requests for SW1 125 from VM1 120*a*, VM2 120*b*, and VMa 145, that SW1 has a projected average concurrent use of three licenses. Thus, license manager 105 may indicate to the cloud service provider that more licenses for SW1 125 are needed. In some embodiments, the license manager 105 may acquire additional licenses from a software vendor itself. In yet further embodiments, the license manager 105 may dynamically acquire more licenses of a particular vendor software 125, 130, 135 as needed, or decrease the number of licenses of a vendor software 125, 130, 135, in-real time, corresponding to the demand for licenses, as determined from the requests received by the license manager 105.

In another set of embodiments, the license manager 105 may make licenses available based on a service level agreement of the customer associated with a particular VM instance 120, 145 requesting the license. In various embodiments, the license manager 105 may first determine a service level agreement of the VM instance 120, 145 or customer associated with the particular VM instance 120, 145 before granting a license for the requested software. Based on the service level agreement between the customer of the VM instance 120, 145 and cloud service provider, the license manager 105 may further determine a priority level of license availability for a particular VM instance 120, 145. When multiple VM instances 120, 145 request an available license, access to the available license will be prioritized based on the priority level, where VM instances 120, 145 with a higher priority level will be given access to available licenses over VM instances 120, 145 having a lower priority level.

In some embodiments, when the license manager 105 receives a request for a license from a VM instance 120, 145 having a first priority level higher than a second priority level of a VM instance 120, 145 already utilizing a license for software 125, 130, 135, the license manager 105 may revoke the license from the VM instance 120, 145 having the lower priority level and grant the license to the VM instance 120, 145 having the higher priority level. In other embodiments, the license manager 105 may ensure that a certain number of licenses of the total number of licenses for particular software 125, 130, 135 remain available to VM instances 120, 145 having a high priority level. For example, in some embodiments, out of the total number of licenses, a certain percentage of the total number of licenses will remain available at all times for VM instances 120, 145 having a high priority level. VM instances 120, 145 having a low priority level will not be granted licenses that are reserved for high priority level customers or VM instances 120, 145. Thus, the license manager 105 may ensure the availability of licenses based on priority levels.

In another set of embodiments, the license manager 105 may further create and enforce restriction conditions on the use of individual licenses. In various embodiments, the restriction conditions may include, without limitation, geographic restrictions, such as, for example, restrictions based on a region, state, country, continent, time zones, etc.; temporal restrictions, such as date and time, duration, etc.; a restriction on the number of times a software instance may be run; VM specific restrictions, such as a network address based restriction; or any other restriction suited to a particular software may be created and implemented. When the conditions specified by the restriction condition occur, the license manager 105 may revoke the granted license. For example, in embodiments utilizing a geographic license restriction, the license manager 105 may be able to detect that a customer has accessed software through the VM 120, 145 from a country in which the software is prohibited. The license manager 105 may then revoke the previously granted license from the VM 120, 145. In another example, embodiments may utilize a temporal restriction condition, such as allowing usage of a license for only a specified period of time—two hours in this example. Thus, when a license is requested and the license has been granted to a VM 120, 145 requesting the license, the license manager 105 may begin tracking the amount of time that has elapsed from when the license was granted. After the specified two hours has elapsed, the license manager 105 revokes the license.

In another set of embodiments, a combination of restriction conditions may be utilized by the license manager 105. For example, in some embodiments, licenses may be made available only to customers for the time period from 8 AM to 5 PM for the particular customer locally. Thus, a software license that is available to a customer belonging to Pacific Time Zone at 3 PM locally may not be available to a customer in the Eastern Time Zone. Therefore, licenses may be made available to customers on a rolling basis as described above. In some embodiments, the restriction conditions may be imposed based on the physical location of a VM instance 120, 145 or host machine server 115, 140. Thus, in various embodiments, the license manager 105 may be able to retrieve location information from an SDR, such as SDR 150 of host machine server 2 140. The license manager 105 may further track and detect license availability for a particular VM as it is moved from one host machine server to another by the network orchestrator 160. For example, as illustrated, VM2 120*b* may be moved from host machine server 1 115 to host machine server 2 140, depicted in phantom lines. In one set of embodiments, the licenses for instances of SW2 130*b* and SW3 135*a* may be available only in specific states. Licenses for SW2 130 may be available to customers or VMs in State A and State B, where host machine server 1 115 is located in State A and host machine server is located in State B. Licenses for SW3 135, on the other hand, may only be available to customers or VMs located in State A. Thus, when VM2 120*b* is relocated from host machine server 1 115 to host machine server 2 140, the licenses for each of SW2 130*b* and SW3 135*a* may be tracked by the license manager 105. The license manager may determine that the restriction condition on the license for SW2 130*b* allows for VM2 120*b* to keep its license, whereas the restriction condition on the license for SW3 135*a* specifies that the license is only valid in State A. Thus, the license manager 105 may revoke the license for SW3 135*a* from VM2 120*b* when it becomes hosted on host machine server 2 140. According to various embodiments, the license manager 105 may similarly manage software licenses for each of the various network element(s) 165 in a similar manner. In this way, the management and tracking functionality of the license manager 105 fundamentally changes the conventional audit-based management schemes. Thus, the above described embodiments allow for automated management and tracking from a centrally operable license manager 105, without having to manually audit the entire cloud-based environment for each individual VM 120, 145 at each host machine server 115, 140. Furthermore, the license manager 105 allows for expanded functionality to create and enforce restriction conditions from a central location. Compare this to the previously used conventional systems that rely on an auditing of each VM 120, 145 or other hardware system, and only subsequently determining restrictions to be applied to those systems discovered in the audit to have been using granted licenses.

Figure 2:
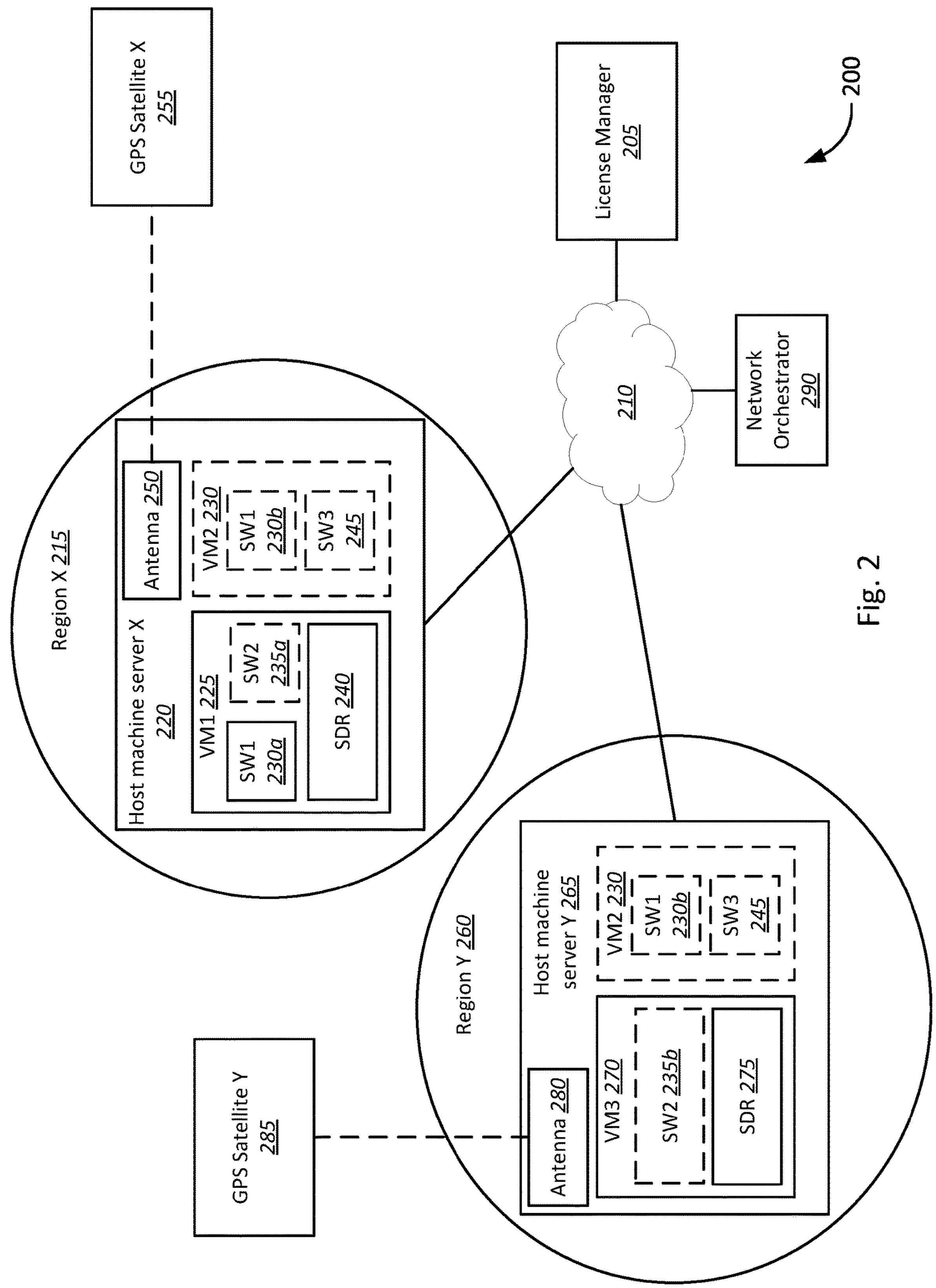
FIG. 2 is a block diagram of a software management system topology, in accordance with various embodiments.

FIG. 2 is a block diagram of a software management system topology 200, in accordance with various embodiments. In various embodiments, the system topology 200 includes a license manager 205, communications network 210, host machine server X 220, host machine server Y 265, GPS satellite X 255, GPS satellite Y 285, and network orchestrator 290. The license manager 205 is communicatively coupled to communications network 210, through which the license manager 205 may communicate with any or all of host machine server X 220, host machine server Y 265, and network orchestrator 290. Host machine server X 220 is located in Region X 215, while host machine server Y is located in Region Y 260. Host machine server X 220 includes two VM instances, VM1 225, and VM2 230. VM1 225 includes a first instance of SW1 230*a* and SW2 235*a*. VM1 225 may also include an SDR 240 operatively coupled to antenna 250. VM2 230 includes a second instance of SW1 230*b* and a first instance of SW3 245. Host machine server X 220 may also include an antenna 250 in communication with GPS satellite X 225. Host machine server Y 265 hosts VM3 270, and may also optionally host VM2 230. VM3 270 includes a second instance of SW2 235*b*, and an SDR 275, operatively coupled to antenna 280. VM2 230 includes the same instances of SW2 230*b* and SW3 245 as it did in host machine server X 220. Host machine server Y 265 also includes its own respective antenna 280 in communication with GPS satellite Y 285.

According to a set of embodiments, the network orchestrator 290 may provision VM1 225 corresponding to a first customer, and VM2 230 corresponding to a second customer on Host machine server X 220, located in Region X 215. The network orchestrator 290 may further provision VM3 270 corresponding to a third customer on host machine server Y 265 located in Region Y 260. VM1 225 may request and receive licenses for two instances of software, SW1 230*a* and SW2 235*a* from license manager 205. VM2 230 may request and receive licenses to run an instance of SW1 230*b* and SW3 245. In some embodiments, the license manager 205 may place a restriction condition on licenses for SW2 235*a*, 235*b* (235 collectively) based on a local time for each particular region. For example, as described in previous embodiments, SW2 235 may have a restriction condition such that licenses are only available from 8 AM to 5 PM local time in each respective region 215, 260. In one embodiment, Region X 215 may be three hours ahead of Region Y 260. Accordingly, when the time in Region X 215 reaches 5 pm, the license for SW2 235*a* may be revoked from VM1 225, and granted to VM3 270 to use with SW2 instance 235*b*. In various embodiments, the local time for VM1 225 may be reported to license manager 205 by VM1 225 using SDR 240. SDR 240 may allow VM1 225 to utilize an antenna 250 of host machine server X 220 to communicate with GPS satellite X 255. Thus, VM1 225 may be able to determine, via the GPS satellite X 255, that the host machine server X 220 that it is hosted on is located in Region X 215. Similarly, VM3 270 may be able to determine its location from GPS satellite Y 285 by utilizing antenna 280 of host machine server Y 265 to communicate with GPS Satellite Y 285 via SDR 275. Alternatively, in other embodiments, the license manager 205 may retrieve location information directly through the host machine server X 220, or via network orchestrator 290 already having location information for host machine server X 220, and host machine server Y 265.

In another set of embodiments, the licenses may not be restricted based on the location of the VM instance 225, 230, 270, but rather based on the location of the customer with whom the VM instance 225, 230, 270 is associated with. Thus, in various embodiments, the license manager may determine the location of customer through a network address of the customer requesting the VM instance 225, 230, 270, such as an IP address; from location information provided by the customer, such as a physical street address for an office; through payment information provided by the customer; or any other suitable identifying information, as known to those in the art, from which a customer's location may be determined. In some embodiments, the license manager 205 may obtain customer location information based on customer input, while in other embodiments, the license manager may obtain customer location information from the network orchestrator 290 or other intermediate device. Accordingly, in some embodiments, the customer associated with VM1 225 may be located in a time zone that is eight hours ahead of the customer associated with VM3 270. Thus, the license granted to VM3 270 for SW2 235B may be revoked by license manager 205 at 5 PM local time for the customer associated with VM3 270, and provided to VM1 225.

In one set of embodiments, the restriction condition may be completely regionally based. For example, in some embodiments, the license for SW2 235 may be restricted from being used in Country A to which Region X 215 belongs. Thus, the license manager may determine that VM1 225 is located in Region X 215, via the GPS location of host machine server X 220, as determined by VM1 225 through SDR 240. The license manager 205 may then revoke the license for SW2 235*a* or refuse to grant the license in the first place. Similarly, geographic restriction conditions placed on licenses may be enforced for specific customers, based on their geographic regions, as opposed to the host machine server 220, 265 on which the VM 225, 230, 270 is hosted.

In a further set of embodiments, licenses may be granted and revoked based on a priority given to a VM 225, 270, or alternatively, to different customers. Thus, in some embodiments, VM3 270 may be given higher priority for license availability than VM1 225. In various embodiments, priority may be given as part of a service level agreement (SLA) offered to customers. Thus, if no licenses are available to VM3 270 at a time when a license to run SW2 235*b* is requested, the license manager 205 may revoke the license given to VM1 225 for SW2 instance 235*a*. In one set of embodiments, some high-level SLAs with customers may guarantee that a license will be available to the customer on demand; within a specified time period; or available at certain times. Some low-level SLAs may notify the customer that their licenses may be given to customers at a higher priority level and that licenses to software may be revoked, or availability to software licenses may be limited based on the SLA.

Accordingly, the management systems 100, 200 of FIGS. 1 & 2 provide expanded management capabilities over conventional audit-based management schemes. By providing a license manager 105, 205, remote, centralized management of multiple software programs or applications from different vendors is possible. Furthermore, multiple and redundant audits are not required for each software instance for each different vendor. Moreover, audit-based systems merely identify the number of licenses in use and the machines on which the licenses are used. By utilizing the system 100, 200, the software licenses may be granted and revoked, use of software licenses may be monitored and tracked, and restriction conditions on licenses may be defined and enforced, for each software instance and for each software vendor, and remotely via the license manager 105, 205. Under the conventional audit-based systems, these operations would be unfeasible, if not impossible to perform.

Figure 3A:
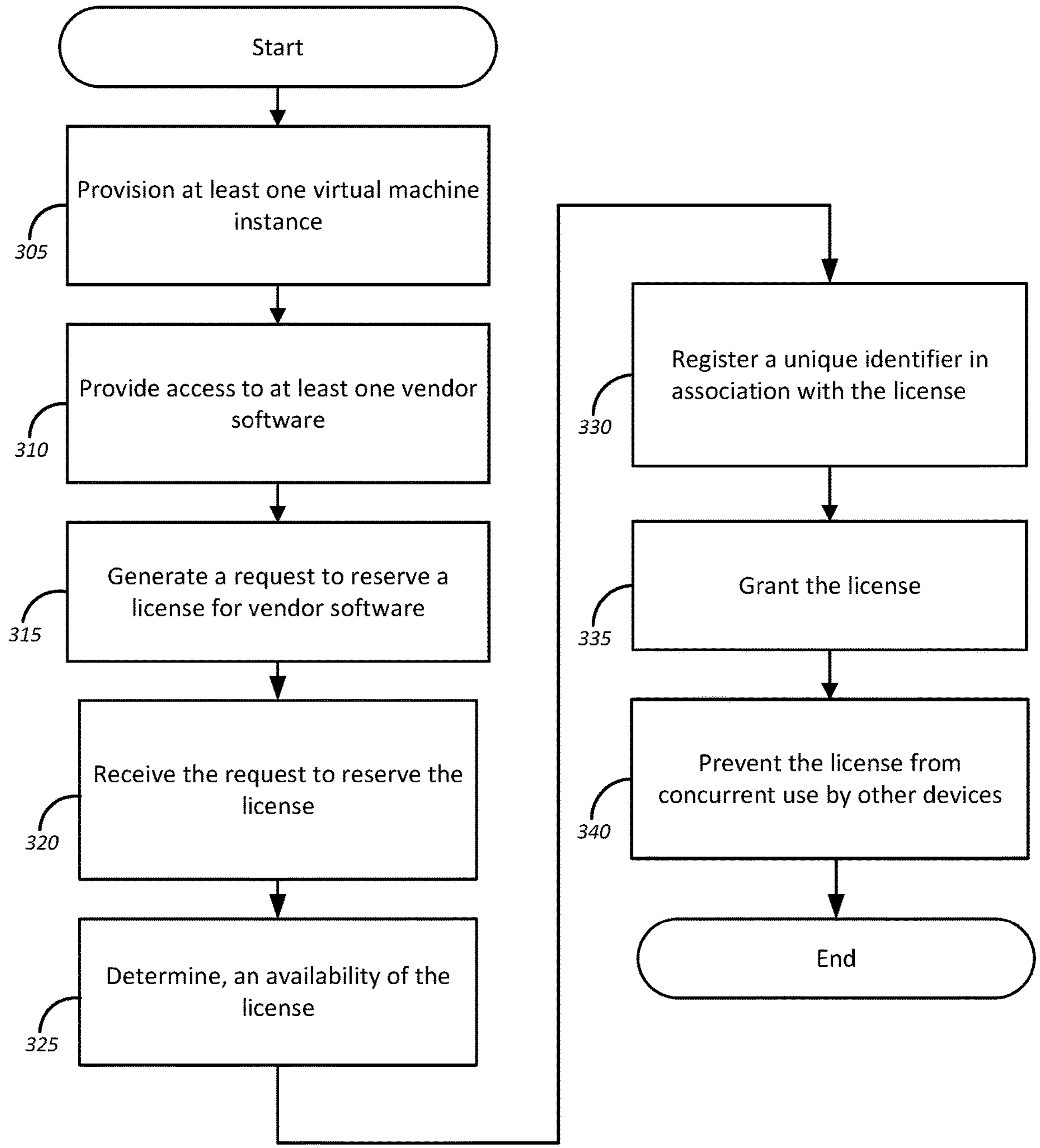
FIG. 3A is a flow diagram of a method for software management in a dynamically scalable environment, in accordance with various embodiments.

FIG. 3A is a flow diagram of a method 300A for software management in a dynamically scalable environment, in accordance with various embodiments. The method 300A begins at block 305, where an at least one VM is provisioned, via a network orchestrator, on a plurality of host machine servers. In various embodiments, the network orchestrator may provision the at least one VM in accordance with a customer's request. In some embodiments, the at least one VM may be provisioned on one or more servers of a plurality of servers, based on a customer's preference. For example, the customer may indicate preference for a particular host machine server, a particular location or region, or other such preference. In other embodiments, a server may be assigned based on a geographic proximity to a customer; geographic proximity to a customer's targeted client base; an SLA with the customer indicating specific hardware or other requirements; the current or estimated computational load of the host machine servers; or any other suitable basis.

At block 310, the plurality of servers grants access to at least one vendor software to each of the at least one VM instances. In various embodiments, one or more programs or applications from a plurality of different software vendors may be made available to each of the at least one VM instances. According to one set of embodiments, the cloud service provider may obtain, from each of the software vendors, a set of licenses for each of the different software programs/applications to be offered to the VM instances. In some embodiments, a customer associated with at least one VM instance may provide software license to be used with their own respective at least one VM instance. In some embodiments, instances of the vendor software may be pre-loaded on the at least one VM instance, while in other embodiments, a vendor software instance may only be loaded onto the at least one VM instance after a license has been granted.

At block 315, a request to reserve an individual license for particular vendor software is generated at at least one of the plurality of servers. The individual license may be reserved for a single VM instance of the at least one VM instance. In various embodiments, the request may include information in addition to the vendor software being requested. For example, the request may include, without limitation, an identifier to identify the customer making the request or the VM instance making the request, a priority level for the customer, an SLA of the customer making the request, or any additional information that may be used in handling the request. Although VM instances are described in this and the following embodiments, it is to be understood that in other embodiments, instead of a VM instance, other network elements, such as databases, routers, switches, firewalls, BRAS, CMTS, DSLAM, OLT, NID, ONT, customer gateways, modems, set top boxes, and other like devices may be interchangeable with the descriptions of the VM instances.

At block 320, the request to reserve a license for vendor software is received by the license manager. In various embodiments, a VM instance may request the license directly from the license manager when the VM instance runs a vendor software instance. In other embodiments, the request may be received from the network orchestrator, or other network element. In some embodiments, the request may be automatically generated by the VM instance based on whether the VM instance is actively in use, or based on an SLA between the customer and cloud service provider. For example, in some embodiments, an SLA may establish that a vendor software instance will be available during a specified time window. Thus, the VM instance may generate the request for a software license in advance of the specified time window such that the software instance may be available for the entirety of the specified time window.

At block 325, the license manager determines the availability of the requested license from the set of authorized licenses of the request vendor software. In various embodiments, each of the licenses granted to virtual machines or other network elements may be associated with an identifier of the device utilizing the license. Accordingly, the license manager may be able to quickly and efficiently determine how many licenses are available. In further embodiments, the license manager may also determine when and how many licenses will become available in the future, and may notify the requesting device regarding when a license is expected to become available. In some embodiments, the license manager may maintain a queue of requesting devices if multiple devices request licenses that are not available. In another set of embodiments, the license manager may determine a priority level of the devices to which a license may have been granted. If the priority level of the device is lower than the priority level of a requesting device, the license manager may determine the license to be available to the requesting device with the higher priority level.

At block 330, a unique identifier of the requesting device is registered in association with an available license. In various embodiments, the unique identifier for the requesting VM instance may be registered in association with the available license. The unique identifier may include, a network address such as an IP address, hardware address such as a MAC address, location information, serial number, model number, customer information or identification, IMEI, MEI, or other identifier suitable to uniquely identify the requesting device, such as the network element, host machine server, or VM instances.

At block 335, the license manager may subsequently grant the available individual license of the set of licenses to the requesting device or VM instance. In various embodiments, the license manager may directly transmit the license to the VM instance or other network device. In other embodiments, the license manager may provide the license to the VM instance via a network orchestrator.

At block 340, the license manager may then prevent the granted license from concurrent use by another device or VM instance subsequently requesting a license. As described above, in various embodiments, the license may be associated with an identifier of the requesting device, such as a VM instance or other network element. Thus, when a subsequent device requests a license of for the vendor software, the license manager will identify the license as having already been granted.

Figure 3B:
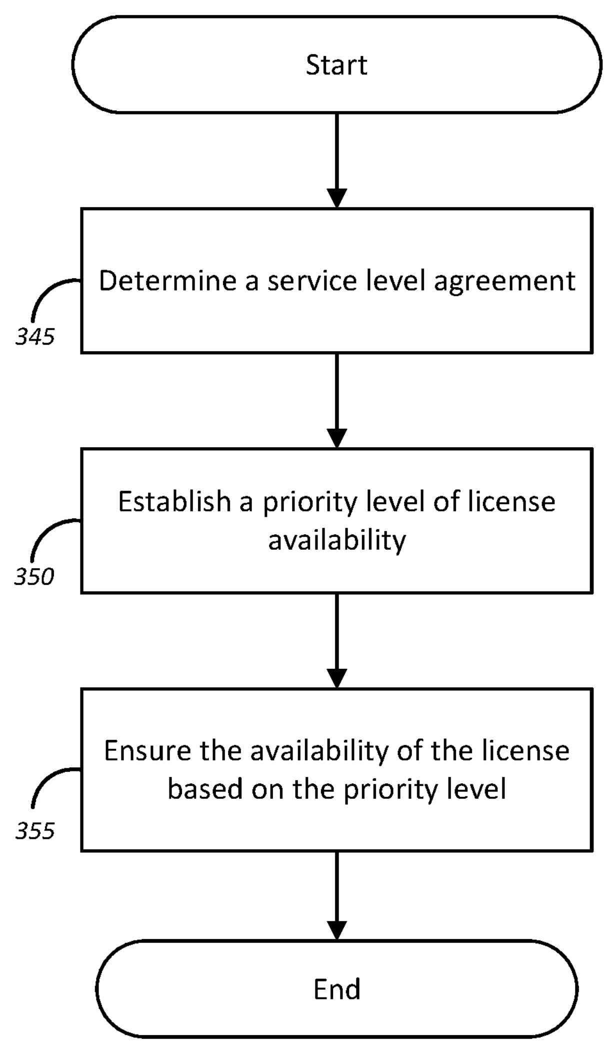
FIG. 3B is a flow diagram of additional processes in a method for software management in a dynamically scalable environment, in accordance with various embodiments.

FIG. 3B is a flow diagram of additional processes in a method 300B for software management in a dynamically scalable environment, in accordance with various embodiments. The method 300B begins at block 345, where the license manager determines a service level agreement applicable to the requesting VM instance, or other requesting device. In various embodiments, the customer associated with the VM instance may have established a SLA with the cloud service provider specifying an availability of different vendor software. Accordingly, at block 350, the license manager may determine a priority level of license availability to the VM instance or other requesting device. In various embodiments, the SLA may specify different availability for different vendor software. Therefore, in some embodiments, the priority level of license availability may vary based on the particular vendor software requested.

At block 355, availability of the license for particular vendor software is ensured by the license manager, according to the established priority level. In various embodiments, this may include reserving all or a certain number of licenses from the set of available licenses for devices given the established priority level. In other embodiments, previously granted licenses may be revoked from devices having a lower priority level than the priority level established for the requesting device. In further embodiments, licenses may be guaranteed to be available within a specific time from when the request was made.

Figure 3C:
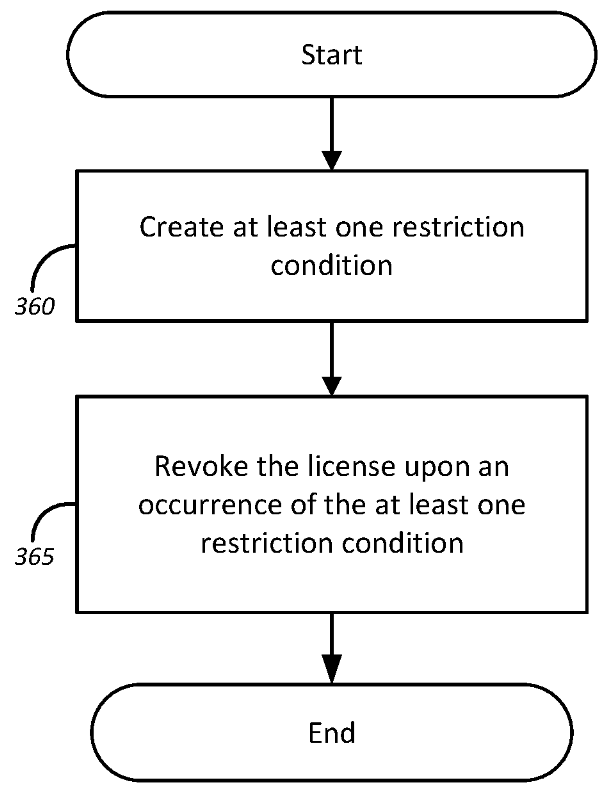
FIG. 3C is a flow diagram of additional processes in a method for software management in a dynamically scalable environment, in accordance with various embodiments.

FIG. 3C is a flow diagram of additional processes in a method 300C for software management in a dynamically scalable environment, in accordance with various embodiments. The method 300C begins at block 360, where the license manager creates an at least one restriction condition on the use of the granted license. In various embodiments, the software vendor may provide the at least one restriction condition to the license manager. The at least one restriction condition may be provided as part of the set of licenses provided to the license manager. In another set of embodiments, the license manager may have an interface, such as, without limitation, a web app or portal, through which software vendors may create restriction conditions on licenses of their software. In some embodiments, the cloud service provider may create the restriction conditions. Restriction conditions may include, without limitation, restrictions based on a region, state, country, continent, time zones, date and time, length of use, a limitation on the number of times a software instance may be run, VM instance or hardware specific restrictions, or any other restriction suitable for restricting use of particular software.

At block 365, the license manager may monitor the VM instance or other device granted the license for the occurrence of the at least one restriction condition. In some embodiments, the VM instance or other device may report the occurrence of a condition, where in others, the license manager may be able to independently monitor for the occurrence of a restriction condition, such as restrictions based on the time of day, length of use, time zones, geographies, etc. In some embodiments, the license manager may further retrieve information about VM instances or other devices through the VM instance or other device itself. For example, in one set of embodiments, the license manager may be able to retrieve GPS information about a VM instance or a host machine server via an SDR of the VM instance.

Figure 3D:
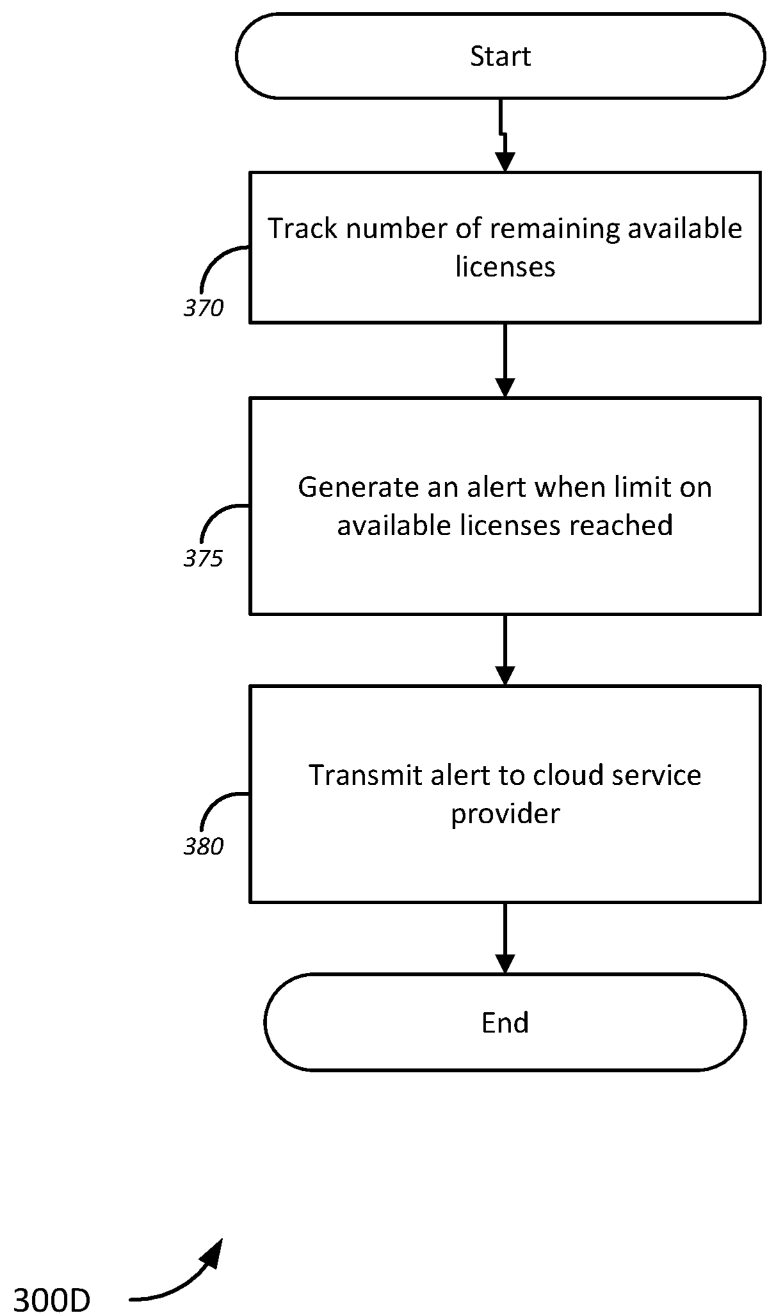
FIG. 3D is a flow diagram of additional processes in a method for software management in a dynamically scalable environment, in accordance with various embodiments.

FIG. 3D is a flow diagram of additional processes in a method 300D for software management in a dynamically scalable environment, in accordance with various embodiments. The method 300D begins at block 370, where the license manager tracks the number of remaining available licenses. When the license manager determines that the number of available licenses reaches a predetermined limit, or that no available licenses for the software remain, the license manager may generate, in block 375, and transmit, in block 380, an alert to the cloud service provider. In various embodiments, the cloud service provider may then secure additional licenses for the particular software. In some embodiments, the license manager may be authorized by the cloud service provider to automatically secure additional licenses from software vendors when the limit is reached. In one set of embodiments, the license manager ma further track the number of times the limit of available licenses has been reached for statistical analysis. In various embodiments, the license manager may determine, among other things, which vendor software reaches its limit of available licenses, peak usage time for each of the vendor software, and average concurrent usage for each of the vendor software. The cloud service provider may be able to determine how to secure additional licenses for each of the vendor software.

Figure 4:
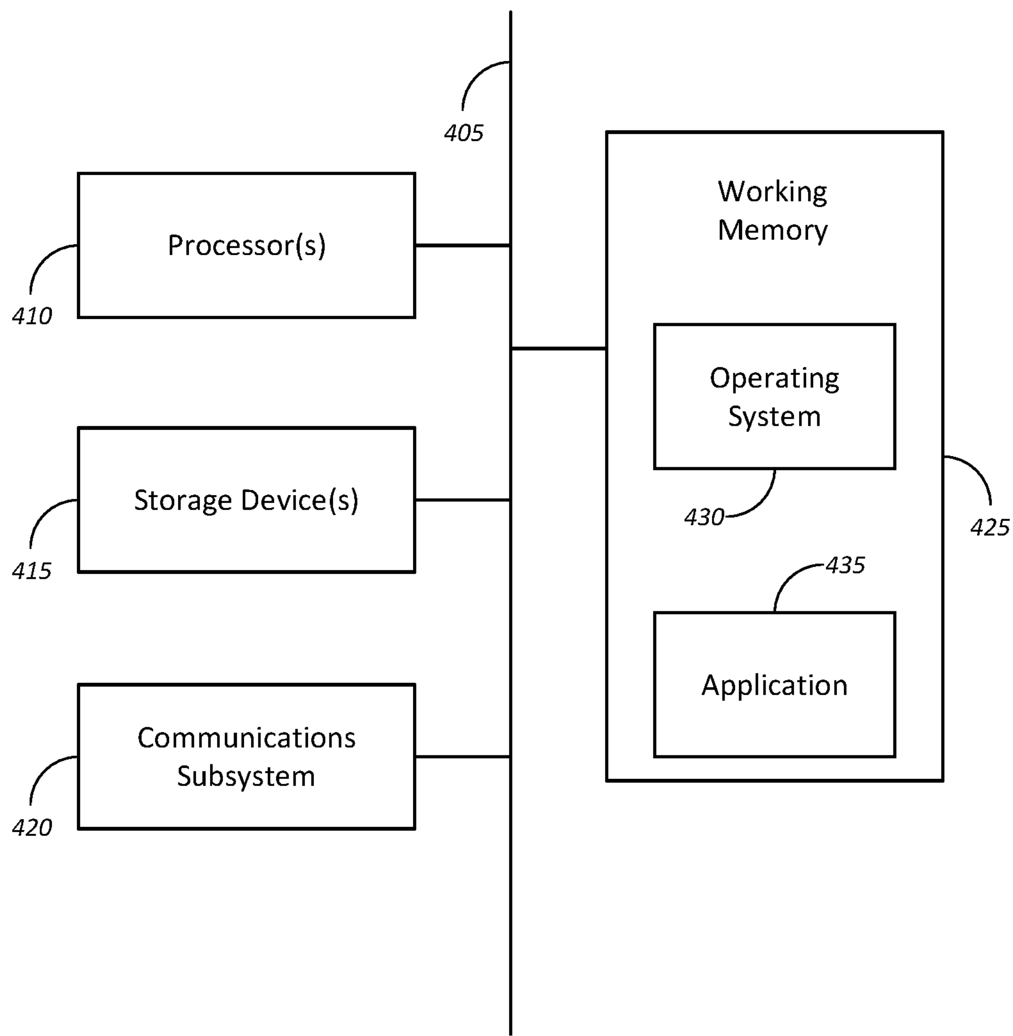
FIG. 4 is a schematic block diagram of computer hardware for a license manager, in accordance with various embodiments.

FIG. 4 is a schematic block diagram of a computer architecture for a license manager, in accordance with various embodiments. FIG. 4 provides a schematic illustration of one embodiment of a computer system 400 that can perform the methods provided by various other embodiments, as described herein, and/or can perform the functions of the license manager, host machine server, virtual machine, network orchestrator, or any other computer systems as described above. It should be noted that FIG. 4 is meant only to provide a generalized illustration of various components, of which one or more (or none) of each may be utilized as appropriate. FIG. 4, therefore, broadly illustrates how individual system elements may be implemented in a relatively separated or integrated manner.

The computer system 400 includes a plurality of hardware elements that can be electrically coupled via a bus 405 (or may otherwise be in communication, as appropriate). The hardware elements may include one or more processors 410, including, without limitation, one or more general-purpose processors and/or one or more special-purpose processors (such as digital signal processing chips, graphics acceleration processors, and/or the like). In general, embodiments can employ as a processor any device, or combination of devices, that can operate to execute instructions to perform functions as described herein. Merely by way of example, and without limitation, any microprocessor (also sometimes referred to as a central processing unit, or "CPU") can be used as a processor, including without limitation one or more complex instruction set computing ("CISC") microprocessors, such as the single core and multicore processors available from Intel Corporation™ and others, such as Intel's X86 platform, including, e.g., the Pentium™, Core™, and Xeon™ lines of processors. Additionally and/or alternatively, reduced instruction set computing ("RISC") microprocessors, such as the IBM Power™ line of processors, processors employing chip designs by ARM Holdings™, and others can be used in many embodiments. In further embodiments, a processor might be a microcontroller, embedded processor, embedded system, system on a chip ("SoC") or the like.

As used herein, the term "processor" can mean a single processor or processor core (of any type) or a plurality of processors or processor cores (again, of any type) operating individually or in concert. Merely by way of example, the computer system 400 might include a general-purpose processor having multiple cores, a digital signal processor, and a graphics acceleration processor. In other cases, the computer system might 400 might include a CPU for general purpose tasks and one or more embedded systems or microcontrollers, for example, to run real-time functions. The functionality described herein can be allocated among the various processors or processor cores as needed for specific implementations. Thus, it should be noted that, while various examples of processors 410 have been described herein for illustrative purposes, these examples should not be considered limiting.

The computer system 400 may further include, or be in communication with, one or more storage devices 415. The one or more storage devices 615 can comprise, without limitation, local and/or network accessible storage, or can include, without limitation, a disk drive, a drive array, an optical storage device, a solid-state drive, flash-based storage, or other solid-state storage device. The solid-state storage device can include, but is not limited to, one or more of a random access memory ("RAM") or a read-only memory ("ROM"), which can be programmable, flash-updateable, or the like. Such storage devices may be configured to implement any appropriate data stores, including, without limitation, various file systems, database structures, or the like.

The computer system 400 might also include a communications subsystem 420, which can include, without limitation, a modem, a network card (wireless or wired), a wireless programmable radio, or a wireless communication device. Wireless communication devices may further include, without limitation, a Bluetooth device, an 802.11 device, a WiFi device, a WiMax device, a WWAN device, cellular communication facilities, or the like. The communications subsystem 420 may permit data to be exchanged with a customer premises, residential gateway, authentication server, a customer facing cloud server, network orchestrator, host machine servers, other network elements, or combination of the above devices, as described above. Communications subsystem 420 may also permit data to be exchanged with other computer systems, and/or with any other devices described herein, or with any combination of network, systems, and devices. According to some embodiments, the network might include a local area network ("LAN"), including without limitation a fiber network, or an Ethernet network; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth protocol, or any other wireless protocol; or any combination of these or other networks.

In many embodiments, the computer system 400 will further comprise a working memory 425, which can include a RAM or ROM device, as described above. The computer system 400 also may comprise software elements, shown as being currently located within the working memory 425, including an operating system 430, device drivers, executable libraries, and/or other code. The software elements may include one or more application programs 435, which may comprise computer programs provided by various embodiments, and/or may be designed to implement methods and/or configure systems provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 425 described above. In some cases, the storage medium might be incorporated within a computer system, such as the system 400. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 400) to perform methods in accordance with various embodiments of the invention. According to a set of embodiments, some or all of the procedures of such methods are performed by the computer system 400 in response to processor 410 executing one or more sequences of one or more instructions (which might be incorporated into the operating system 430 and/or other code, such as an application program 435) contained in the working memory 425. Such instructions may be read into the working memory 425 from another computer readable medium, such as one or more of the storage device(s) 415. Merely by way of example, execution of the sequences of instructions contained in the working memory 425 might cause the processor(s) 410 to perform one or more procedures of the methods described herein.

The terms "machine readable medium" and "computer readable medium," as used herein, refer to any medium that participates in providing data that causes a machine to operation in a specific fashion. In an embodiment implemented using the computer system 400, various computer readable media might be involved in providing instructions/code to processor(s) 410 for execution and/or might be used to store and/or carry such instructions/code (e.g., as signals). In many implementations, a computer readable medium is a non-transitory, physical and/or tangible storage medium. In some embodiments, a computer readable medium may take many forms, including but not limited to, non-volatile media, volatile media, or the like. Non-volatile media includes, for example, optical and/or magnetic disks, such as the storage device(s) 415. Volatile media includes, without limitation, dynamic memory, such as the working memory 425.

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals and/or the like, are all examples of carrier waves on which instructions can be encoded, in accordance with various embodiments of the invention.

The communications subsystem 420 (and/or components thereof) generally will receive the signals, and the bus 405 then might carry the signals (and/or the data, instructions, etc. carried by the signals) to the processor(s) 410, or working memory 425, from which the processor(s) 410 retrieves and executes the instructions. The instructions received by the working memory 425 may optionally be stored on a storage device 415 either before or after execution by the processor(s) 410.

According to a set of embodiments, the computer system 400 may be a license manager having access to, and in communication with, one or more host machine servers. In various embodiments, each of the one or more host machine servers may themselves include one or more hardware elements similar to computer system 400. The computer system 400 may then receive a request for a license for vendor software, via the communications subsystem 420, from at least one VM instance hosted on one of the one or more host machine servers. The computer system 400 may also be in communication with a network orchestrator of the cloud service environment. In response to receiving the response, the computer system 400 may include computer readable media, having stored thereon a plurality of instructions, which, when executed by the processor 410, allows the computer system 400 to determine, the availability of a license for the requested vendor software.

In various embodiments, the computer system 400 may further include a license database storing one or more sets of authorized licenses, each set of authorized licenses corresponding to a respective vendor software. In some embodiments, the storage device(s) 415 may comprise at least part of the license database. In other embodiments, the license database may be a separate device from computer system 400, the license database having its own set of hardware elements similar to computer system 400. In various embodiments, the license database may further store information associating a customer with individual licenses of the set of licenses.

Once a license has been determined by the computer system 400 to be available, the computer system 400 may register an identifier of the VM instance or customer requesting the license in association with the available license. In various embodiments, the computer system 400 may retrieve a unique identifier of the requesting VM instance or customer, via communications subsystem 420. In some embodiments, the computer system 400 may identify a network address, hardware address, location information, serial number, model number, customer information or identification, IMEI, MEI, or other identifier suitable to uniquely identify the VM instance or customer making the request. This information may alternatively be included in the request for the license, as received by the computer system 400.

The computer system 400 may then grant the individual license to the requesting VM instance or VM instance associated with the customer requesting the license, and subsequently preventing the granted license from being used concurrently by any other VM instances or devices. In various embodiments, the computer system 400 may retrieve the license information from the license database and subsequently distribute the license to the requesting VM instance or other device via the communications subsystem 420. In some embodiments, the computer system 400 may also implement a pay-as-you-go structure, monitoring each time a license is granted to a particular VM instance or requesting customer.

In a further set of embodiments, the computer system 400 may further determine a service level agreement of each of the at least one customer or customer associated with the requesting VM instance. This information may be retrieved, via the communications subsystem 420, directly from the VM instance, or otherwise provided in the request as received. Based on the service level agreement, the computer system 400 may establish a priority level of license availability to the at least one client respectively. The computer system 400 may then ensure the availability of an individual license to the at least one client based on the priority level. The computer system 400 may monitor the license database to ensure the availability of licenses in a various ways. In some embodiments, the computer system 400 reserve all or a certain number of licenses from the set of available licenses for devices given the established priority level. In other embodiments, previously granted licenses may be revoked, by the computer system 400, from devices having a lower priority level than the priority level established for the requesting device. In further embodiments, licenses may be guaranteed to be available within a specific time of when the request was made.

The computer system 400 may further create at least one restriction condition on the use of the individual license determining the availability of the individual license, and revoke the individual license upon an occurrence of the at least one restriction condition. In various embodiments, the computer system 400 may create restriction conditions based on software vendor requirements, or as provided by the customers. Restriction conditions may include, without limitation, geographic restrictions, temporal restrictions, and restrictions on the number of times a license has been used or the rate of use. The computer system 400 may then monitor for the occurrence of the at least one restriction condition and revoke the license upon the occurrence of a restriction condition.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture, but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system for managing software in dynamically scalable network environments, the system comprising:

a plurality of servers hosting one or more virtual machine instances, each of the plurality of servers in communication with a service network and accessible to at least one client, at least one virtual machine instance of the one or more virtual machine instances associated with the at least one client, each of the one or more virtual machine instances having a unique identifier;

a network orchestrator in communication with the plurality of servers, wherein the network orchestrator handles requests from the at least one client to provision the at least one virtual machine instance associated with the at least one client in one or more of the plurality of servers;

a license manager in communication with each of the one or more virtual machine instances, the license manager comprising:

at least one processor;

a network communications interface in communication with the plurality of servers and the network orchestrator;

a license database having one or more sets of authorized licenses, each set of authorized licenses respectively associated with a respective vendor software;

non-transitory computer readable media having encoded thereon a set of instructions executable by the at least one processor to:

receive, via the network communications interface, from one of the at least one virtual machine instance, a request to reserve an individual license of the set of authorized licenses for a vendor software instance on one of the at least one virtual machine instance, the vendor software instance requiring the individual license to run on the one of the at least one virtual machine instance;

determine, via the license database, an availability of the individual license associated with the vendor software instance in the request;

grant, in response to determining that the individual license is available, the individual license to the one of the at least one virtual machine;

track, via communication with the network orchestrator, the individual license from a first virtual machine instance of the at least one virtual machine instance utilizing the vendor software to a second virtual machine instance of the at least one virtual machine instance utilizing the vendor software, wherein the network orchestrator migrates the first virtual machine instance from a first server of the plurality of servers to a second server of the plurality of servers as the second virtual machine instance;

receive, from the one of the at least one virtual machine instance, a request to renew the individual license granted to the one of the at least one virtual machine; and determine, via the license database, whether the individual license is available to be renewed based on whether the individual license has been reserved or requested by another virtual machine.

2. The system of claim 1, wherein the license manager further comprises instructions in the set of instructions to:

determine a service level agreement of each of the at least one client;

establish, based on the service level agreement, a priority level of license availability to the at least one client respectively; and ensure the availability of an individual license to the at least one client based on the priority level.

3. The system of claim 2, wherein an individual license in a set of authorized licenses may be reserved for the at least one client based on the priority level.

4. The system of claim 1, wherein the license manager further comprises instructions in the set of instructions to:

create at least one restriction condition on the use of the individual license determining the availability of the individual license; and revoke the individual license upon an occurrence of the at least one restriction condition.

5. The system of claim 4, wherein a location of a server of the plurality of servers hosting the at least one virtual machine instance is determined based on the unique identifier of the at least one virtual machine instance, wherein the at least one restriction condition restricts the availability of the individual license based on the location of the server.

6. The system of claim 4, wherein the plurality of servers includes a software defined radio in communication with the license manager, the software defined radio i dentifying a physical location of a server of the plurality of servers hosting the at least one virtual machine instance, wherein the at least one restriction condition restricts the availability of the individual license based on the physical location of the server of the plurality of servers.

7. The system of claim 1, wherein the license manager further comprises instructions in the set of instructions to:

generate an alert when the number of available individual licenses in a set of authorized licenses reaches a limit; and transmit the alert to a service provider providing the set of authorized licenses indicating that the limit has been reached, or to one of the at least one client having the individual license indicating the individual license may be revoked.

8. The system of claim 1, wherein the license manager further comprises instructions in the set of instructions to:

determine whether the second virtual machine instance requires another individual license for the vendor software; and determine, in response to determining that another individual license is required, an availability of a second individual license for use by the second virtual machine.

9. A license manager comprising:

at least one processor;

a network communications interface in communication with a plurality of servers hosting one or more virtual machine instances and a network orchestrator in communication with the plurality of servers, wherein the network orchestrator handles requests from the at least one client to provision the at least one virtual machine instance associated with the at least one client in one or more of the plurality of servers;

a license database having one or more sets of authorized licenses, each set of authorized licenses corresponding to a respective vendor software;

non-transitory computer readable media having encoded thereon a set of instructions executable by the at least one processor to:

receive, via the network communications interface, from one of the at least one virtual machine instance, a request to reserve an individual license of the set of authorized licenses for a vendor software instance on the one of the at least one virtual machine instance, the vendor software instance requiring the individual license to run on the one of the at least one virtual machine instance;

determine, via the license database, an availability of the individual license associated with the vendor software instance in the request;

grant, in response to determining that the individual license is available, the individual license to the one of the at least one virtual machine;

track, via communication with the network orchestrator, the individual license from a first virtual machine instance of the at least one virtual machine instance utilizing the vendor software to a second virtual machine instance of the at least one virtual machine instance utilizing the vendor software, wherein the network orchestrator migrates the first virtual machine instance from a first server of the plurality of servers to a second server of the plurality of servers as the second virtual machine instance;

receive, from the one of the at least one virtual machine instance, a request to renew the individual license granted to the one of the at least one virtual machine; and determine, via the license database, whether the individual license is available to be renewed based on whether the individual license has been reserved or requested by another virtual machine.

10. The license manager of claim 9, wherein the license manager further comprises instructions in the set of instructions to:

determine a service level agreement of each of the at least one client;

establish, based on the service level agreement, a priority level of license availability to the at least one client respectively; and ensure the availability of an individual license to the at least one client based on the priority level.

11. The license manager of claim 10, wherein an individual license in a set of authorized licenses may be reserved for the at least one client based on the priority level.

12. The license manager of claim 10, wherein an individual license may be revoked from a first client having a first priority level and granted to a second client having a second priority level higher than the first priority level.

13. The license manager of claim 9, wherein the license manager further comprises instructions in the set of instructions to:

create at least one restriction condition on the use of the individual license determining the availability of the individual license; and revoke the individual license upon an occurrence of the at least one restriction condition.

14. The license manager of claim 13, wherein a location of a server of the plurality of servers hosting the at least one virtual machine instance is determined based on the unique identifier of the at least one virtual machine instance, wherein the at least one restriction condition restricts the availability of the individual license based on the location of the server.

15. The license manager of claim 13, wherein the plurality of servers includes a software defined radio in communication with the license manager, the software defined radio identifying a physical location of a server of the plurality of servers hosting the at least one virtual machine instance, wherein the at least one restriction condition restricts the availability of the individual license based on the physical location of the server of the plurality of servers.

16. The license manager of claim 9, wherein the license manager further comprises instructions in the set of instructions to:

generate an alert when the number of available individual licenses in a set of authorized licenses reaches a limit; and transmit the alert to a service provider providing the set of authorized licenses indicating that the limit has been reached, or to one of the at least one client having the individual license indicating the individual license may be revoked.

17. A method for managing licenses comprising:

provisioning, via a network orchestrator, at least one virtual machine instance on a plurality of servers, each of the at least one virtual machine instance associated with an at least one client;

providing, via the plurality of servers, access to at least one vendor software to each of the at least one virtual machine instances;

generating, at at least one of the plurality of servers, a request to reserve an individual license in a set of authorized licenses for a particular vendor software, the individual license reserved in association with a virtual machine instance of the at least one virtual machine instance, the virtual machine instance associated respectively with a client of the at least one client;

receiving, via a license manager, the request to reserve the individual license in the set of authorized licenses for the particular vendor software, the particular vendor software requiring the individual license to run on the virtual machine instance;

determining, via the license manager, an availability of the individual license from the set of authorized licenses;

in response to determining that the individual license is available, granting, via the license manager, the individual license to the virtual machine instance;

tracking, with the license manager via communication with the network orchestrator, the individual license from a first virtual machine instance of the at least one virtual machine instance utilizing the vendor software to a second virtual machine instance of the at least one virtual machine instance utilizing the vendor software, wherein the network orchestrator migrates the first virtual machine instance from a first server of the plurality of servers to a second server of the plurality of servers as the second virtual machine instance;

receiving, from the one of the at least one virtual machine instance, a request to renew the individual license granted to the one of the at least one virtual machine; and determining, via the license database, whether the individual license is available to be renewed based on whether the individual license has been reserved or requested by another virtual machine.

18. The method of claim 17, further comprising:

determining, via the license manager, a service level agreement of the virtual machine instance;

establishing, via the license manager, based on the service level agreement, a priority level of license availability to the virtual machine instance; and ensuring, via the license manager, the availability of an individual license to the virtual machine instance based on the priority level.

19. The method of claim 17, further comprising:

creating, at the license manager, at least one restriction condition on the use of the individual license determining the availability of the individual license; and revoking, via the license manager, the individual license upon an occurrence of the at least one restriction condition.

* * * * *